United States Patent
Iwata et al.

(10) Patent No.: US 9,635,842 B2
(45) Date of Patent: May 2, 2017

(54) ROD BODY FOR FISHING ROD AND FISHING ROD PROVIDED THEREWITH

(71) Applicant: SHIMANO INC., Sakai-shi, Osaka (JP)

(72) Inventors: Soshi Iwata, Sakai (JP); Yoshiyuki Kaminou, Sakai (JP); Nobuhiro Suganuma, Sakai (JP)

(73) Assignee: Shimano Inc., Osaka (JP)

( * ) Notice: Subject to any disclaimer, the term of this patent is extended or adjusted under 35 U.S.C. 154(b) by 303 days.

(21) Appl. No.: 14/102,549

(22) Filed: Dec. 11, 2013

(65) Prior Publication Data

US 2014/0173967 A1   Jun. 26, 2014

(30) Foreign Application Priority Data

Dec. 25, 2012   (JP) ................................. 2012-281229

(51) Int. Cl.
*A01K 87/00*   (2006.01)
*A01K 87/08*   (2006.01)

(52) U.S. Cl.
CPC .............. *A01K 87/00* (2013.01); *A01K 87/08* (2013.01)

(58) Field of Classification Search
CPC ...... A01K 87/00; A01K 87/002; A01K 87/02; A01K 87/08
USPC ......... 43/18.1 R, 18.5, 18.1 CT, 18.1 HR, 23
See application file for complete search history.

(56) References Cited

U.S. PATENT DOCUMENTS

| 2,749,643 | A | * | 6/1956 | Scott | A01K 87/00 |
| | | | | | 43/18.5 |
| 3,260,010 | A | * | 7/1966 | Dubois | A01K 87/00 |
| | | | | | 43/18.5 |
| 3,416,255 | A | * | 12/1968 | Johnson | A01K 87/025 |
| | | | | | 43/18.5 |

(Continued)

FOREIGN PATENT DOCUMENTS

| GB | 2064420 A | * | 6/1981 | ............. A01K 87/00 |
| JP | 59-182173 U | | 12/1984 | |

(Continued)

OTHER PUBLICATIONS

Translation of JP04-316442.*

(Continued)

*Primary Examiner* — Darren W Ark
(74) *Attorney, Agent, or Firm* — Westerman, Hattori, Daniels & Adrian, LLP

(57) ABSTRACT

A main body layer 78 is configured by a layer 75 formed, in a cylindrical shape, from a main part 76 and a complementary part 77. The main part 76 is formed by a main prepreg 70. In a small-diameter part, the main prepreg 70 is wound over the entire circumference in a circumferential direction with both ends of the main prepreg 70 in a widthwise direction overlapping each other, and in a large-diameter part, the main prepreg 70 is wound so that a part of the entire circumference in the circumferential direction remains behind as a winding-shortage part, with both ends of the main prepreg 70 in the widthwise direction separated from each other in the circumferential direction. The complementary part 77 is formed to complement the winding-shortage part by a sub-prepreg 71 having a predetermined shape corresponding to the winding-shortage part.

8 Claims, 11 Drawing Sheets

(56) References Cited

U.S. PATENT DOCUMENTS

| | | | | |
|---|---|---|---|---|
| 3,581,425 A * | 6/1971 | Orr | ...................... | A01K 87/00 43/18.5 |
| 3,629,029 A * | 12/1971 | Holahan | ................ | A01K 87/00 156/189 |
| 4,043,074 A * | 8/1977 | Airhart | ................... | A01K 87/00 43/18.5 |
| 4,070,127 A * | 1/1978 | Loomis | ................... | A01K 87/02 43/18.5 |
| 4,083,140 A * | 4/1978 | Van Auken | ............ | A01K 87/00 43/18.5 |
| 4,132,579 A * | 1/1979 | VanAuken | ............. | A63B 53/10 156/189 |
| 4,133,708 A * | 1/1979 | Tokuno | ................... | A01K 87/00 43/18.5 |
| 4,138,301 A * | 2/1979 | VanAuken | ............. | A01K 87/00 156/189 |
| 4,319,750 A * | 3/1982 | Roy | ........................ | A63B 53/10 273/DIG. 23 |
| 4,362,418 A * | 12/1982 | Loomis | ................... | A01K 87/02 43/18.5 |
| 4,464,856 A * | 8/1984 | Holden | ................... | A01K 87/00 43/18.5 |
| 4,468,270 A * | 8/1984 | Green | .................... | B29C 53/562 43/18.5 |
| 4,601,127 A * | 7/1986 | Maeda | .................... | A01K 87/08 43/18.5 |
| 4,854,068 A * | 8/1989 | Maeda | .................... | A01K 87/08 43/18.5 |
| 5,028,464 A * | 7/1991 | Shigetoh | ................ | A63B 53/10 156/173 |
| 5,231,783 A * | 8/1993 | Utsuno | ................... | A01K 87/00 43/18.5 |
| 5,317,828 A * | 6/1994 | Yasui | ..................... | A01K 87/00 43/18.5 |
| 5,328,742 A * | 7/1994 | Tukihara | ................ | A01K 87/00 43/18.1 R |
| 5,401,345 A * | 3/1995 | Park | ...................... | A01K 87/002 156/172 |
| 5,421,573 A * | 6/1995 | Kawamatsu | ............ | A63B 53/10 273/DIG. 23 |
| 5,427,373 A * | 6/1995 | Kusumoto | ............. | A63B 53/10 273/DIG. 23 |
| 5,686,155 A * | 11/1997 | Suzue | ..................... | A01K 87/00 428/298.1 |
| 5,926,992 A * | 7/1999 | Tsurufuji | ............. | A01K 87/002 43/18.1 R |
| 6,148,558 A * | 11/2000 | Ono | ........................ | A01K 87/00 43/18.1 R |
| 6,273,830 B1 * | 8/2001 | Takemura | ............. | A63B 53/10 428/36.9 |
| 6,301,821 B1 * | 10/2001 | Suzue | ..................... | A01K 87/00 43/18.5 |
| 6,306,047 B1 * | 10/2001 | Kusumoto | ............. | A63B 53/10 428/36.3 |
| 6,354,957 B1 * | 3/2002 | Saito | ....................... | A63B 53/10 473/289 |
| 6,505,430 B1 * | 1/2003 | Tsurufuji | ............. | B29C 70/205 43/18.5 |
| 6,692,377 B2 * | 2/2004 | Galloway | ............. | A63B 53/10 156/188 |
| 7,045,032 B2 * | 5/2006 | Morimoto | ............. | A01K 87/00 156/187 |
| 7,305,792 B2 * | 12/2007 | Kato | ....................... | A01K 87/00 43/18.5 |
| 7,374,629 B2 * | 5/2008 | Morimoto | ............. | A01K 87/00 156/187 |
| 7,758,445 B2 * | 7/2010 | Oldenburg | ............ | A63B 53/10 473/289 |
| 8,001,716 B1 * | 8/2011 | Lepage | .................. | A01K 87/00 43/18.5 |
| 9,010,014 B2 * | 4/2015 | Iwanari | ................... | A01K 87/00 43/18.5 |
| 2011/0272079 A1 * | 11/2011 | Lepage | .................. | A01K 87/00 156/85 |
| 2015/0272099 A1 * | 10/2015 | Oikawa | .................. | A01K 87/06 43/22 |

FOREIGN PATENT DOCUMENTS

| | | | | |
|---|---|---|---|---|
| JP | 62280026 A | * | 12/1987 | |
| JP | 62292422 A | * | 12/1987 | |
| JP | 02113931 A | * | 4/1990 | |
| JP | 03-061030 A | | 3/1991 | |
| JP | 04183347 A | * | 6/1992 | |
| JP | 04304832 A | * | 10/1992 | |
| JP | 04316442 A | * | 11/1992 | |
| JP | 06007058 A | * | 1/1994 | |
| JP | 2013223467 A | * | 2/1994 | |
| JP | H069876 B2 | * | 2/1994 | |
| JP | 06133671 A | * | 5/1994 | |
| JP | EP 0610037 A1 | * | 8/1994 | ............ A01K 87/02 |
| JP | 06284841 A | * | 10/1994 | |
| JP | EP 0517188 B1 | * | 1/1996 | ............ A01K 87/00 |
| JP | EP 0715807 A1 | * | 6/1996 | ............ A01K 87/00 |
| JP | 09182547 A | * | 7/1997 | |
| JP | 10085373 A | * | 4/1998 | |
| JP | 10271934 A | * | 10/1998 | |
| JP | 3033051 B2 | * | 4/2000 | |
| JP | 2001136869 A | * | 5/2001 | |
| JP | 2002045090 A | * | 2/2002 | |
| JP | 2002153168 A | * | 5/2002 | |
| JP | 2002240158 A | * | 8/2002 | |
| JP | 2004001283 A | * | 1/2004 | |
| JP | 2005218459 A | * | 8/2005 | |
| JP | 2006166841 A | * | 6/2006 | |
| JP | 3838558 B2 | * | 10/2006 | |
| JP | 2007202433 A | * | 8/2007 | |
| JP | 2007209259 A | * | 8/2007 | |
| JP | 2007244396 A | * | 9/2007 | |
| JP | 2007319133 A | * | 12/2007 | |
| JP | 2008154511 A | * | 7/2008 | |
| JP | 2008271875 A | * | 11/2008 | |
| JP | 4229390 B2 | * | 2/2009 | |
| JP | 2009039011 A | * | 2/2009 | |
| JP | 2010104263 A | * | 5/2010 | |
| JP | 2010252813 A | * | 11/2010 | |
| JP | WO 2010150421 A1 | * | 12/2010 | ............ A01K 87/00 |
| JP | 2011004614 A | * | 1/2011 | |
| JP | 2011041516 A | * | 3/2011 | |
| JP | 2011200192 A | * | 10/2011 | |
| JP | 2011211906 A | * | 10/2011 | |
| JP | 2011244693 A | * | 12/2011 | |
| JP | 2012179134 A | * | 9/2012 | |
| JP | 2013074847 A | * | 4/2013 | |
| KR | 20030003006 A | * | 1/2003 | |

OTHER PUBLICATIONS

Notice of Reasons for Rejection dated Jul. 22, 2016, issued in Japanese Patent Application No. 2012-281229, with English translation (5 pages).

* cited by examiner

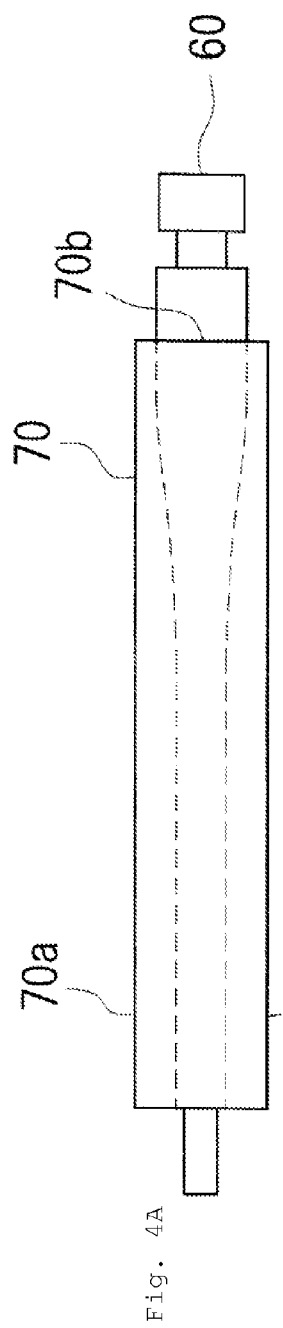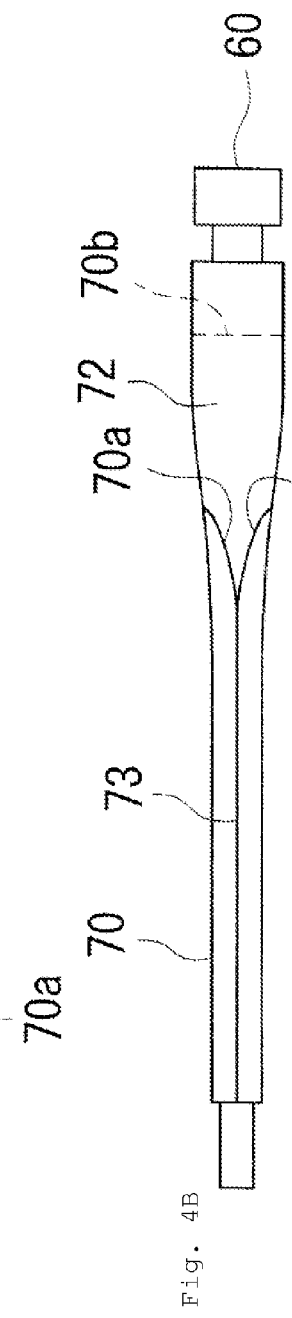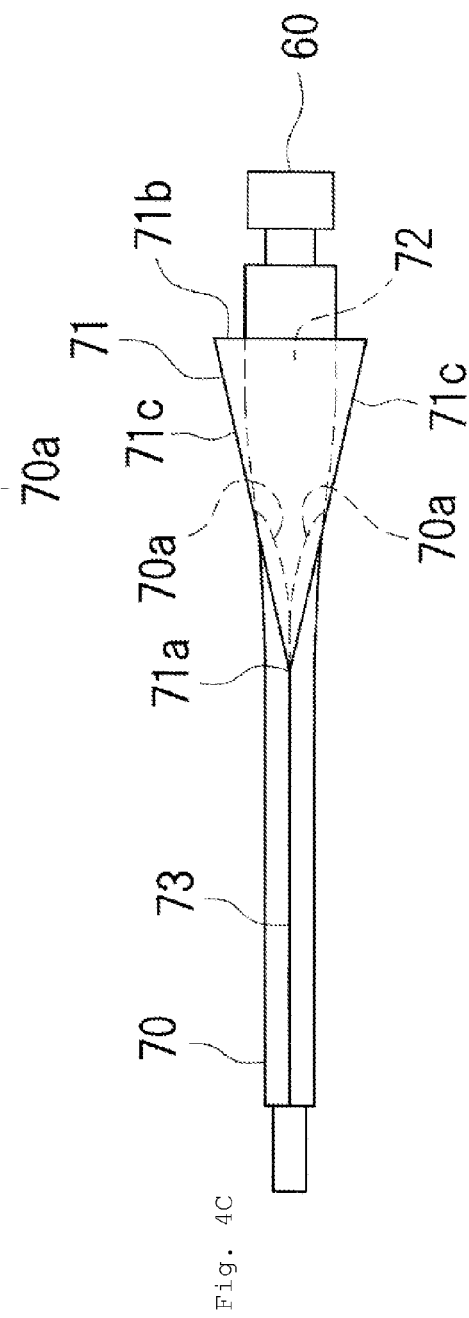

ROD BODY FOR FISHING ROD AND FISHING ROD PROVIDED THEREWITH

BACKGROUND OF THE INVENTION

1. Field of the Invention

The present invention relates to a rod body for a fishing rod, and a fishing rod provided therewith.

2. Description of the Related Art

For example, when a grip part is to be provided on a rod base part, it is often the case that a cylindrical grip part is formed from cork and foamed resin, and is then attached to the rear outer circumferential surface of a rod body formed, in a cylindrical shape, from a prepreg. However, when the grip part is to be configured separately from the rod body, it becomes difficult to reduce the weight.

In contrast, as in the Utility Model Application Publication No. S59-182173, there is a configuration in which the grip part is formed integrally by expanding, by a steep incline, the diameter of the rear part of the rod body. In such a case, by winding the prepreg around a mandrel that matches in shape with the rod body, the rod body can be formed integrally by including the grip part having a large diameter, which is advantageous in reducing the weight. However, when the prepreg is wound onto the mandrel, there is a problem that wrinkles occur easily in the prepreg at the tapered part, etc., where the diameter is expanded by the steep incline, and because a task of winding the prepreg while avoiding the occurrence of the wrinkles is difficult, a person performing the task was required to have high skills.

SUMMARY OF THE INVENTION

Therefore, the present invention has been achieved in view of the above conventional problem, and an object thereof is to provide a rod body for a fishing rod that can be manufactured easily even when the skills of the person performing the task are low, and to provide a fishing rod using such a rod body.

The present invention has been achieved to resolve the above problem, and the rod body for the fishing rod according to the present invention is characterized as a rod body having a main body layer formed, in a cylindrical shape, from a prepreg, wherein the main body layer includes a small-diameter part positioned at a front side, a large-diameter part positioned at a rear side, and a steeply-expanded diameter part positioned between the small-diameter part and the large-diameter part, both an inner and an outer diameters of the steeply-expanded diameter part are expanded toward the rear side by a steeper incline than the incline of the small-diameter part and the incline of the large-diameter part, of the entire length of the main body layer, a predetermined-length region including at least the steeply-expanded diameter part is configured by a layer formed, in a cylindrical shape, from a main part and a complementary part, the main part is formed by a main prepreg having a length corresponding to the predetermined-length region, and in the small-diameter part, the main prepreg is wound over the entire circumference in a circumferential direction with both ends of the main prepreg in the widthwise direction overlapping each other, and in the large-diameter part, the main prepreg is wound so that a part of the entire circumference in the circumferential direction remains behind as a winding-shortage part, with both ends of the main prepreg in the widthwise direction separated from each other in the circumferential direction, and the complementary part is formed to complement the winding-shortage part by a sub-prepreg having a predetermined shape corresponding to the winding-shortage part.

It is noted that the rod tip side is the front side and the rod tail side is the rear side. Furthermore, the inclination of the small-diameter part and the inclination of the large-diameter part may be zero, that is, the small-diameter part and the large-diameter part may have a straight shape.

In the rod body for a fishing rod having such a configuration, the predetermined-length region including the steeply-expanded diameter part is not configured from a single prepreg; the predetermined-length region is formed by the main part including the main prepreg and the complementary part including the sub-prepreg. That is, while the main prepreg is wound over the entire circumference in the circumferential direction in the small-diameter part, the main prepreg is not wound over the entire circumference; however, the main prepreg is wound to deliberately leave out a part of the entire circumference in the large-diameter part. Therefore, in the large-diameter part, both ends of the main prepreg in the widthwise direction are separated from each other, and a winding-shortage part, where winding is left out, exists between the both ends. Thus, the winding-shortage part is taken care of by a separate sub-prepreg. In this way, by configuring the predetermined-length region including at least the steeply-expanded diameter part of the entire length of the main body layer by a layer formed in a cylindrical shape from the main part including the main prepreg and the complementary part including the sub-prepreg, it becomes less likely that wrinkles occur in the prepreg even when there exists a steeply-expanded diameter part of which the diameter is expanded by a steep incline.

The above-described sub-prepreg may be wound before the main prepreg; however it is preferable that the sub-prepreg is wound after winding the main prepreg because it is easier to manufacture in this way. That is, it is preferable to form the complementary part with the sub-prepreg positioned outside the main prepreg.

Furthermore, it is preferable that the layer formed, in a cylindrical shape, from the main part and the complementary part is configured by laminating a plurality of layers while displacing the layer in the circumferential direction. While the layer formed, in a cylindrical shape, from the main part and the complementary part may be configured by a single layer, it is preferable to have a plurality of layers, which makes it possible to use a thin prepreg and the occurrence of wrinkles can be reduced further. In addition, when a multi-layer structure is to be formed, it is preferable to laminate the layers by displacing each layer in the circumferential direction, because of which the overlapping part of both ends in the widthwise direction of the main prepreg and the overlapping part of the main prepreg and the sub-prepreg is displaced in the circumferential direction between the inner layer and the outer layer, and the thickness of the rod body becomes uniform.

Particularly, it is preferable to configure the layer formed, in a cylindrical shape, from the main part and the complementary part by laminating three layers while displacing the layer by 120° at one time in the circumferential direction, and to configure the layer formed, in a cylindrical shape, from the main part and the complementary part by laminating two layers by displacing the layer by 180° in the circumferential direction. In such a case, a rod body that is balanced by distributing the above-described overlapping part in the circumferential direction is obtained. Furthermore, if there are four or more layers, the overlapping parts increase in number, and therefore, it is preferable to have a two-layer or a three-layer structure.

Furthermore, the main prepreg preferably is a rectangle that is long in the direction of the center line of the rod body, and the sub-prepreg preferably is an isosceles triangle with the front side as an apex. In this configuration, the cutting loss of the prepreg is also less, and furthermore, manufacturing is easy.

Furthermore, both the main prepreg and the sub-prepreg are preferred to be made of a prepreg in which a vertical sheet having reinforced fibers running along the direction of the center line of the rod body and a horizontal sheet having reinforced fibers running along the circumferential direction of the rod body are laminated, which makes it possible to easily secure the strength of the main body layer.

Furthermore, the fishing rod according to the present invention is provided with a rod body for a fishing rod as described above.

As described above, because the configuration is such that in the large-diameter part, a part of the entire circumference is left unwound by the main prepreg, and a winding-shortage part that is left unwound is complemented by the sub-prepreg, as compared to the configuration in which the predetermined-length region including a steeply-expanded diameter part is formed in a cylindrical shape by winding provided by a single prepreg, it is less likely that wrinkles occur in the prepreg, and manufacturing can be made easily even when the skills of the person performing the task are low.

BRIEF DESCRIPTION OF THE DRAWINGS

FIG. 4A through FIG. 4C are front views illustrating the manufacturing process of the rod body of the same embodiment.

DETAILED DESCRIPTION OF THE EMBODIMENTS

Figure 1:
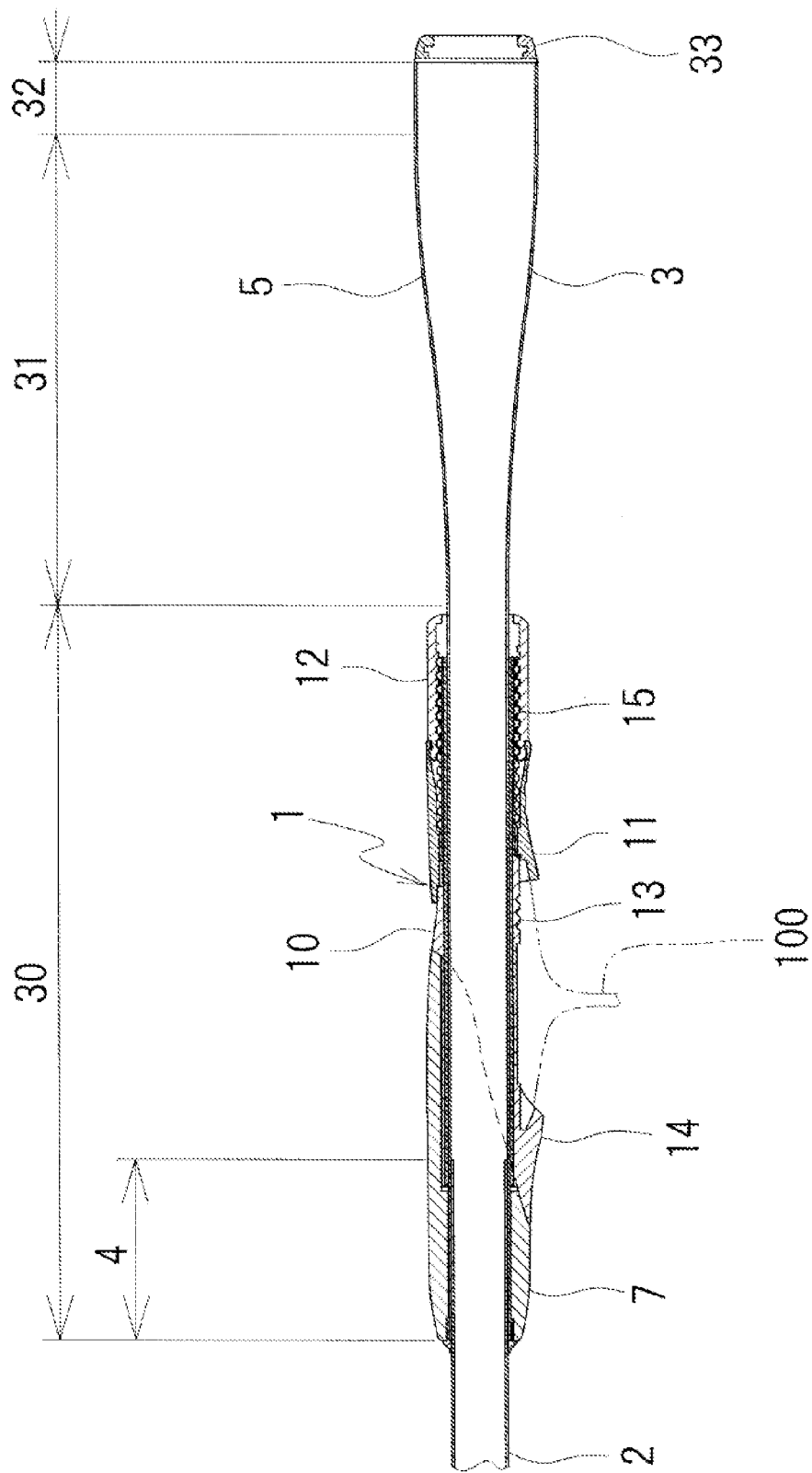
FIG. 1 is a cross-sectional view illustrating the main parts of a fishing rod in an embodiment of the present invention.

Hereinafter, the fishing rod according to an embodiment of the present invention, and the rod body used in the fishing rod will be described with reference to FIG. 1 through FIG. 10. As illustrated in FIG. 1, the fishing rod according to the present embodiment is provided with a reel seat 1 for mounting a reel. The reel seat 1 is cylindrical in shape and is also called a pipe seat, and includes a reel seat main body 10, a movable hood body 11, and a nut 12. The reel seat main body 10 is formed from a synthetic resin or the like by molding, and includes a reel leg mounting part 13 for mounting a leg part 100 of the reel, and a fixed hood part 14 in which one side of the leg part 100 of the reel is inserted. It must be noted that in the present embodiment, the reel seat 1 for mounting a spinning reel is explained as an example, and therefore, as illustrated in FIG. 1, in the usage state, the reel leg mounting part 13 of the reel seat main body 10 is positioned at the lower side. Furthermore, the fixed hood part 14 of the reel seat main body 10 is positioned at the front side. A male screw part 15 is formed in the rear part of the reel seat main body 10, and the nut 12 is threaded onto the male screw part 15. At the front side of the nut 12, there is positioned the movable hood body 11 in which the other side of the leg part 100 of the reel is inserted. The movable hood body 11 is rotatably engaged relative to the nut 12, and therefore, when the nut 12 is rotated, the movable hood body 11 moves, without being rotated, forward and backward along with the nut 12. By moving the movable hood body 11 at the front side, that is, by bringing the movable hood body 11 close to the fixed hood part 14, the leg part 100 of the reel can be fixed to the reel seat main body 10 while being held at the front and the rear. Furthermore, by moving the movable hood body 11 at the rear side, that is, by moving the movable hood body 11 away from the fixed hood part 14, the fixed state of the leg part 100 of the reel is canceled, and the reel can be removed from the fishing rod. In addition, a front grip part 7 is provided at the front side of the reel seat 1. The front grip part 7 is separate from the reel seat main body 10, and is formed from a foamed synthetic resin such as EVA, and cork, or the like.

A fishing rod in which the reel sheet 1 is thus attached includes a rod main body 2, and a rear grip rod body 3 that is joined integrally at the rear side of the rod main body 2 so as to form an overlapping part 4 having a predetermined length. In the overlapping part 4, the rear part of the rod main body 2 is positioned at the inner side, and the front part of the rear grip rod body 3 is positioned outside the rear part thereof.

The rod main body 2 is provided with a main body layer formed in a cylindrical shape by winding a sheet-like prepreg that is cut in a predetermined shape onto a mandrel, and carbon fibers, glass fibers, or the like can be used as the reinforced fibers of the prepreg, and while carbon fibers are particularly preferable, if carbon fibers are to be used, it is preferable to increase the proportion of the carbon fibers. The rear grip rod body 3 also is provided with a main body layer formed in a cylindrical shape by winding a sheet-like prepreg that is cut in a predetermined shape onto a mandrel, and the manufacturing method is described later.

The thickness of the rear grip rod body 3 is almost constant over the entire length, and is almost the same as the thickness in the rear part of the rod main body 2. A rear grip part 5 is formed integrally in the rear grip rod body 3, and the rear grip part 5 is positioned at the rear side of the reel seat 1. The rear grip part 5 is used by bringing in contact with the elbow of the hand that is holding the fishing rod, and if casting is to be performed with both hands, then by grasping with the hand other than the one holding the reel seat 1.

Figure 2:
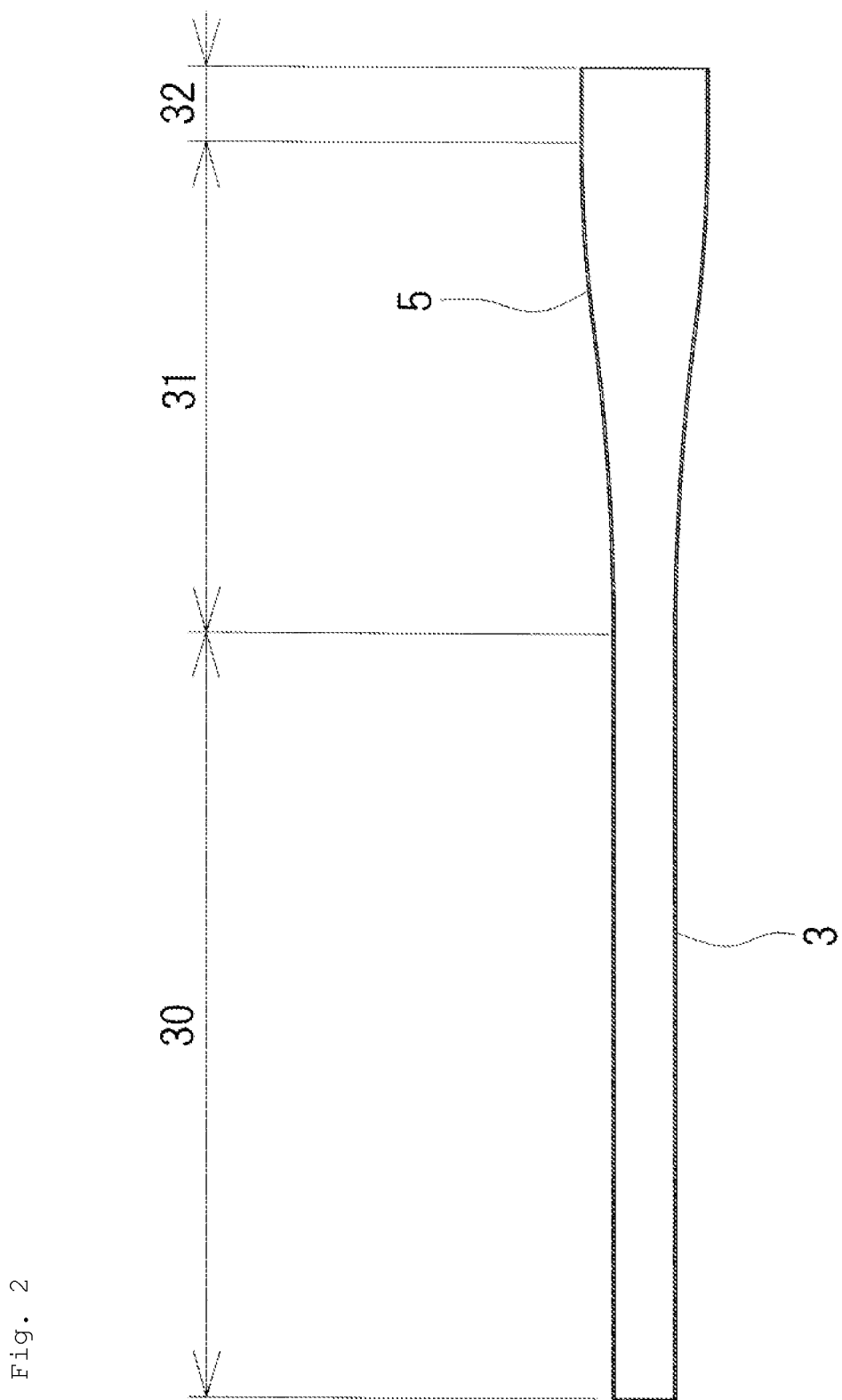
FIG. 2 is a cross-sectional view illustrating a rod body used in the fishing rod of the same embodiment.

As illustrated in FIG. 2, a steeply-expanded diameter part 31 of which the diameter is expanded by a steep incline that is larger than the incline of the front part is formed in the rear part of the rear grip rod body 3, and the rear grip part 5 is formed integrally in the rear part of the rear grip rod body 3 by the steeply-expanded diameter part 31. That is, the rear grip rod body 3 is configured, in an order starting from the front side, by a straight-shaped, that is, zero-inclination small-diameter part 30 having a predetermined length and a constant diameter, the steeply-expanded diameter part 31 of which both the inner and the outer diameters are expanded by a steep incline from the small-diameter part 30, and a straight-shaped, that is, zero-inclination large-diameter part 32 that extends rearward from the steeply-expanded diameter part 31 by a predetermined length, and has a constant diameter. The rear grip part 5 is configured mainly from the rear region of the steeply-expanded diameter part 31, and the large-diameter part 32. It must be noted that the length of the large-diameter part 32 is shorter than the length of the small-diameter part 30, and is also shorter than the length of the steeply-expanded diameter part 31. Furthermore, the reel sheet main body 10 is attached to the small-diameter part 30 of the rear grip rod body 3, and the rear grip rod body 3 overlaps the rod main body 2 in the small-diameter part 30 thereof. It is noted that a tail stopper 33 is attached to the rear end of the rear grip rod body 3.

Figure 3:
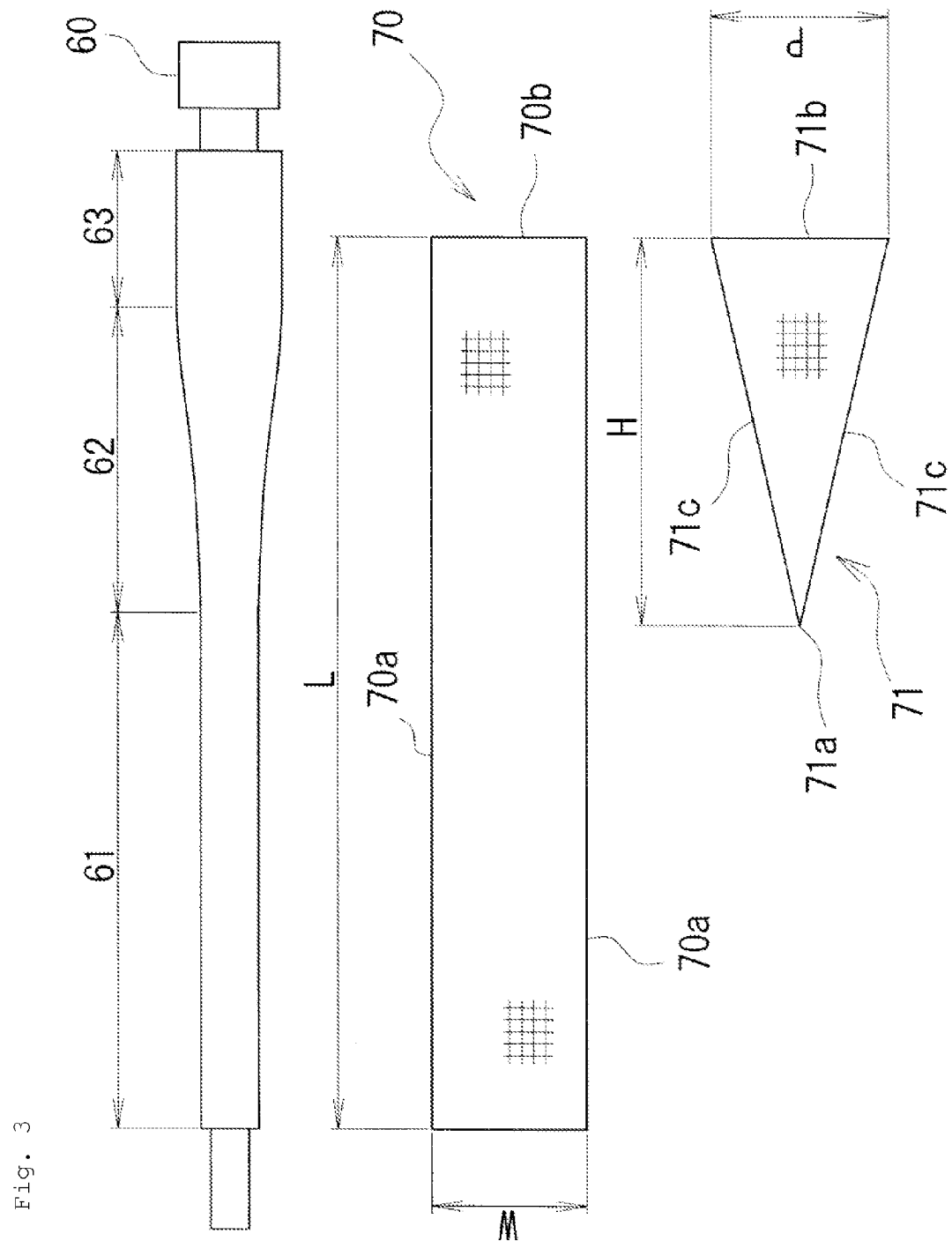
FIG. 3 is a front view illustrating a method of manufacturing a rod body of the same embodiment.
Figure 5:
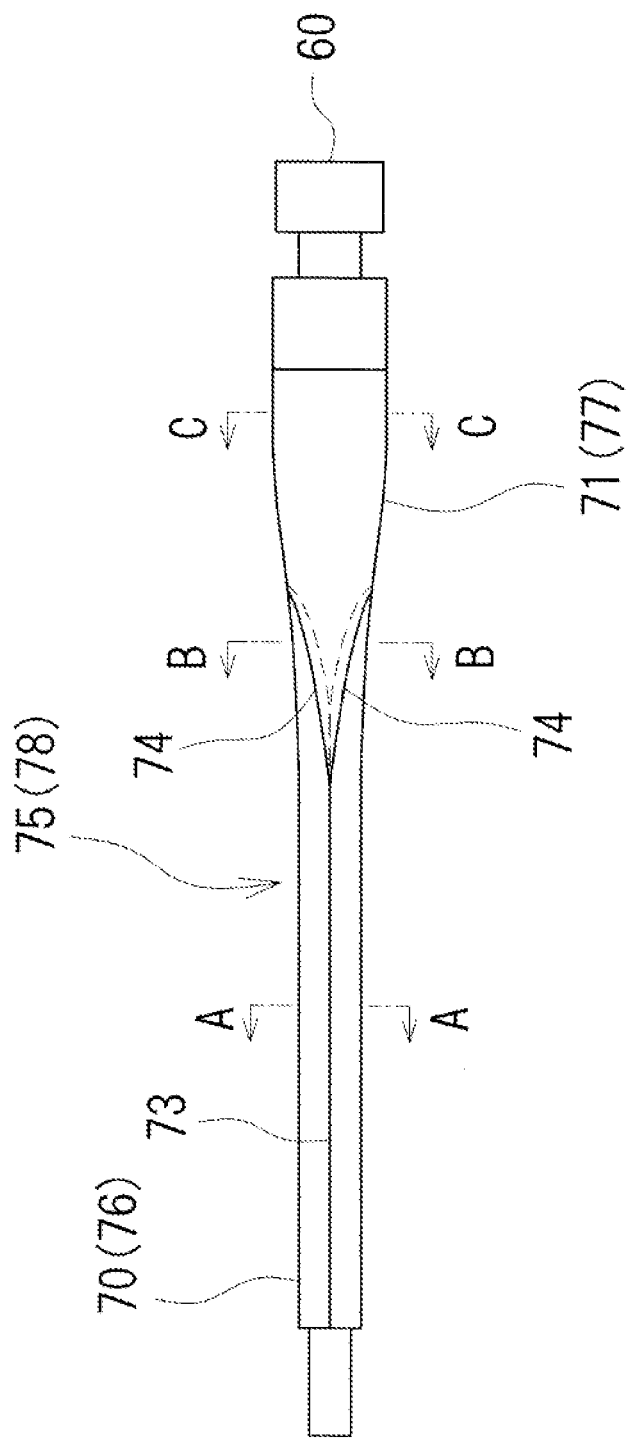
FIG. 5 is a front view illustrating a manufacturing process of the rod body of the same embodiment.
Figure 10:
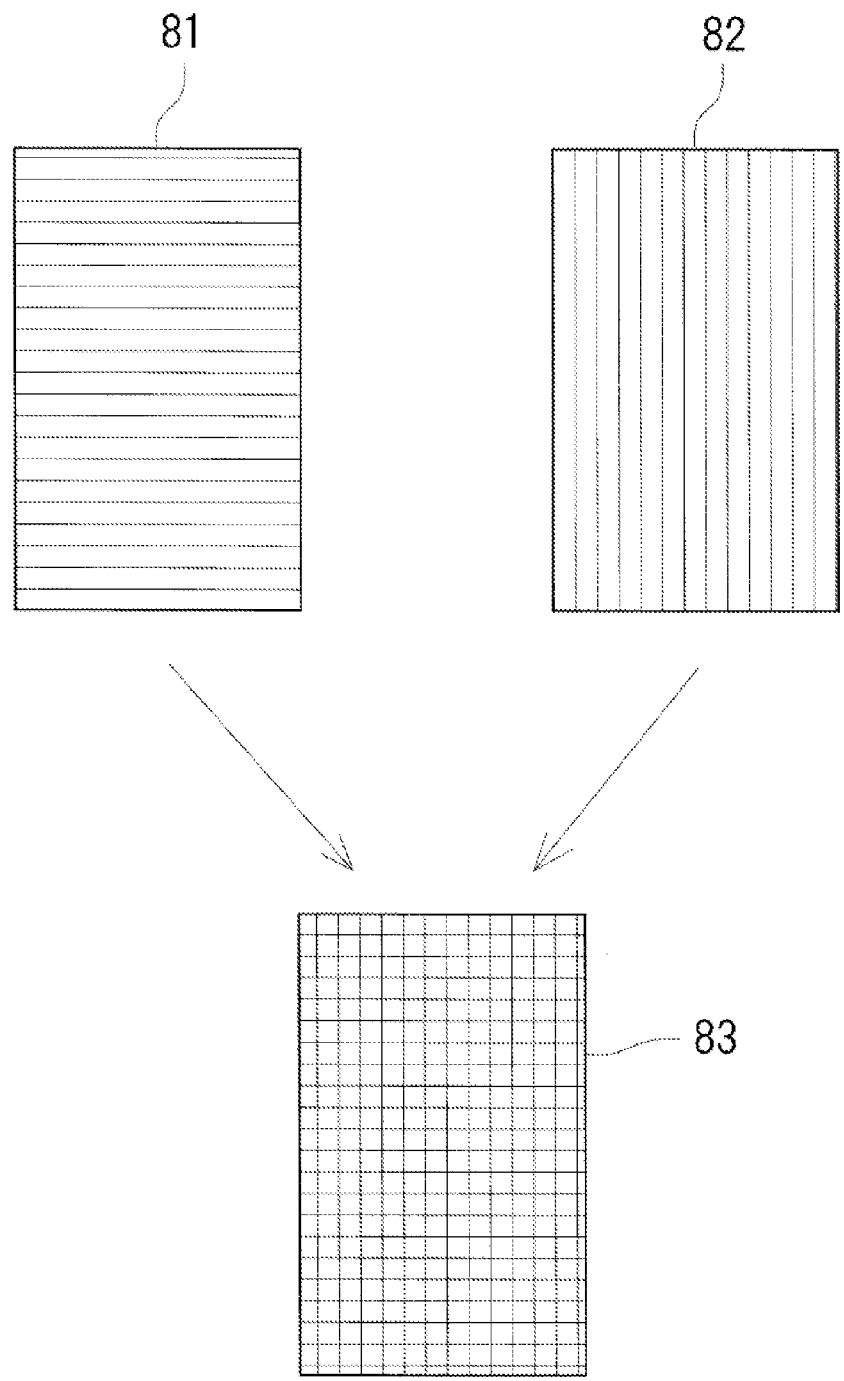
FIG. 10 is a configuration diagram of a prepreg used in the rod body of the same embodiment.

The detailed structure of such a rear grip rod body 3 is described next along with the method of manufacturing the rear grip rod body 3. As illustrated in FIG. 3, a mandrel 60 has a shape matching the shape of the rear grip rod body 3. Therefore, the mandrel 60 has a shape that includes, in an order starting from the front side, a first region 61 for forming the small-diameter part 30, a second region 62 for forming the steeply-expanded diameter part 31, and a third region 63 for forming the large-diameter part 32. As the prepreg for forming the cylindrical main body layer, a rectangular main prepreg 70 and an isosceles triangle-shaped sub-prepreg 71 are used. The main prepreg 70 is a rectangle that is long in the direction of the center line of the rear grip rod body 3, and the length L thereof is a length corresponding to the entire length of the rear grip rod body 3, that is, the entire length of the main body layer. That is, the length has a predetermined margin so as to enable cutting of the ends after heating and baking to form the rear grip rod body 3 of a predetermined length. A width W of the main prepreg 70 is provided to the extent that the first region 61 of the mandrel 60 is wound once, and therefore, the entire circumference of the third region 63 of the mandrel 60 cannot be wound, and a predetermined angle region of the entire circumference is left unwound. The sub-prepreg 71 is an isosceles triangle with the apex angle being a sharp angle, and an apex 71*a* thereof is used as the rod tip side. A length P of a bottom edge 71*b* of the sub-prepreg 71 is slightly longer than the width W of the main prepreg 70, and a height H (the length in the direction of the center line of the rear grip rod body 3) is almost equal to the length obtained by combining the steeply-expanded diameter part 31 and the large-diameter part 32 of the rear grip rod body 3. It is noted that as illustrated in FIG. 10, such a main prepreg 70 and a sub-prepreg 71 are cut from a laminate sheet 83 in which a vertical sheet 81 having reinforced fibers running along the direction of the center line of the rear grip rod body 3 and a horizontal sheet 82 having reinforced fibers running along the circumferential direction of the rear grip rod body 3 are laminated and formed integrally. Same as in the above-described case of the rod main body 2, carbon fibers, and the like can be used as the reinforced fibers.

First of all, as in FIG. 4A, the center of the widthwise direction of the main prepreg 70 is set to match the center of the mandrel 60, and the main prepreg 70 is wound onto the mandrel 60. When the main prepreg 70 is wound onto the mandrel 60, then as illustrated in FIG. 4B, in the first region 61 of the mandrel 60, the main prepreg 70 goes around in one turn, and both ends 70*a* of the main prepreg 70 in the widthwise direction overlap inside and outside to form an overlapping part 73. On the other hand, from the second region 62 of the mandrel 60 up to the third region 63, the both ends 70*a* in the widthwise direction of the main prepreg 70 gradually separate from each other in the circumferential direction, and the clearance also increases gradually toward the rear side. Thus, from the second region 62 of the mandrel 60 up to the third region 63, a certain main prepreg 70 lacks one wound, and one part of the entire circumference is left unwound, which results in the formation of a winding-shortage part 72, that is, a remaining region left unwound. The winding-shortage part 72 has a shape in which the width gradually increases toward the rear side. It must be noted that the length in the circumferential direction of the winding-shortage part 72 is an arbitrary value, which also changes depending on the ratio of the diameter of the first region 61 to the third region 63 of the mandrel 60, that is, the ratio of the inner diameter or the outer diameter of the small-diameter part 31 to that of the large-diameter part 32, for example, in a rear end 70*b* of the main prepreg 70, approximately half of the circumference is wound by the main prepreg 70, and the remaining approximately half circumference can be left unwound.

In addition, the winding-shortage part 72 is complemented by the sub-prepreg 71. That is, as in FIG. 4C, the rear end of the sub-prepreg 71, that is, the bottom edge 71*b* thereof is aligned with the rear end 70*b* of the main prepreg 70, and at the same time, the center of the widthwise direction of the sub-prepreg 71 is aligned with the center of the mandrel 60. The sub-prepreg 71 is set such that the apex 71*a* of the sub-prepreg 71 is positioned in the overlapping part 73 of the main prepreg 70. In addition, the sub-prepreg 71 is wound while covering the winding-shortage part 72. The sub-prepreg 71 is wound while forming an overlapping part 74 having a predetermined width, with each of both inclined edges 71*c* of the sub-prepreg 71 running along the both ends 70*a* in the widthwise direction of the main prepreg 70. By thus complementing the winding-shortage part 72 by the sub-prepreg 71, a cylindrical layer 75 in which the prepreg is wound one round over the entire length is formed, as in FIG. 5.

Figure 6:
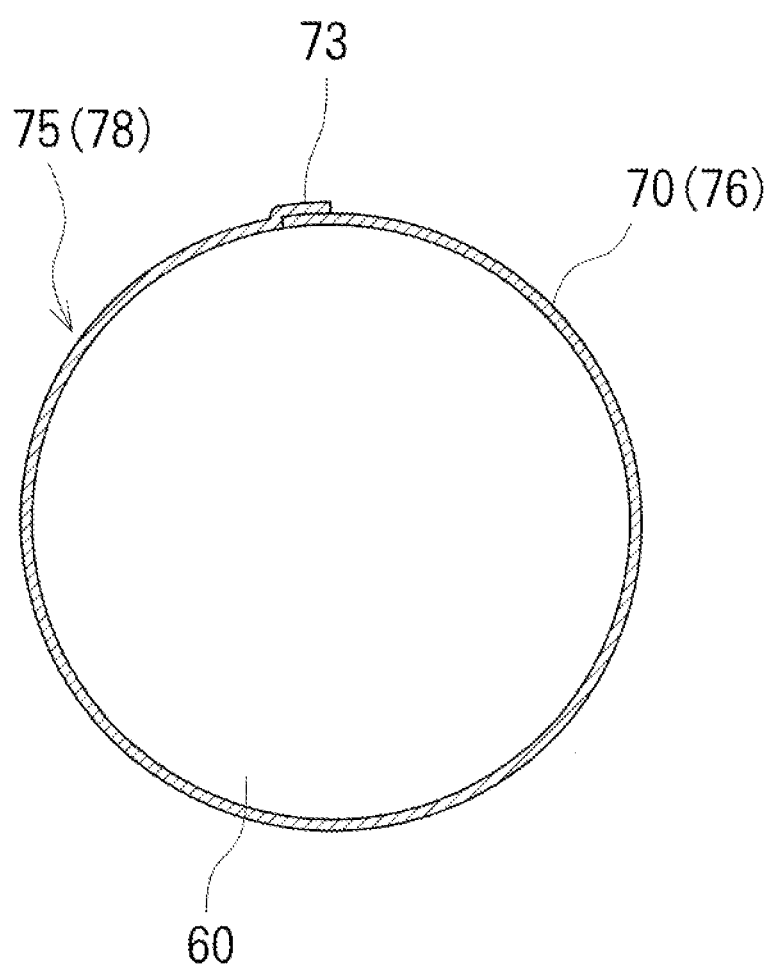
FIG. 6 is a cross-sectional view of an A-A line of FIG. 5.
Figure 7:
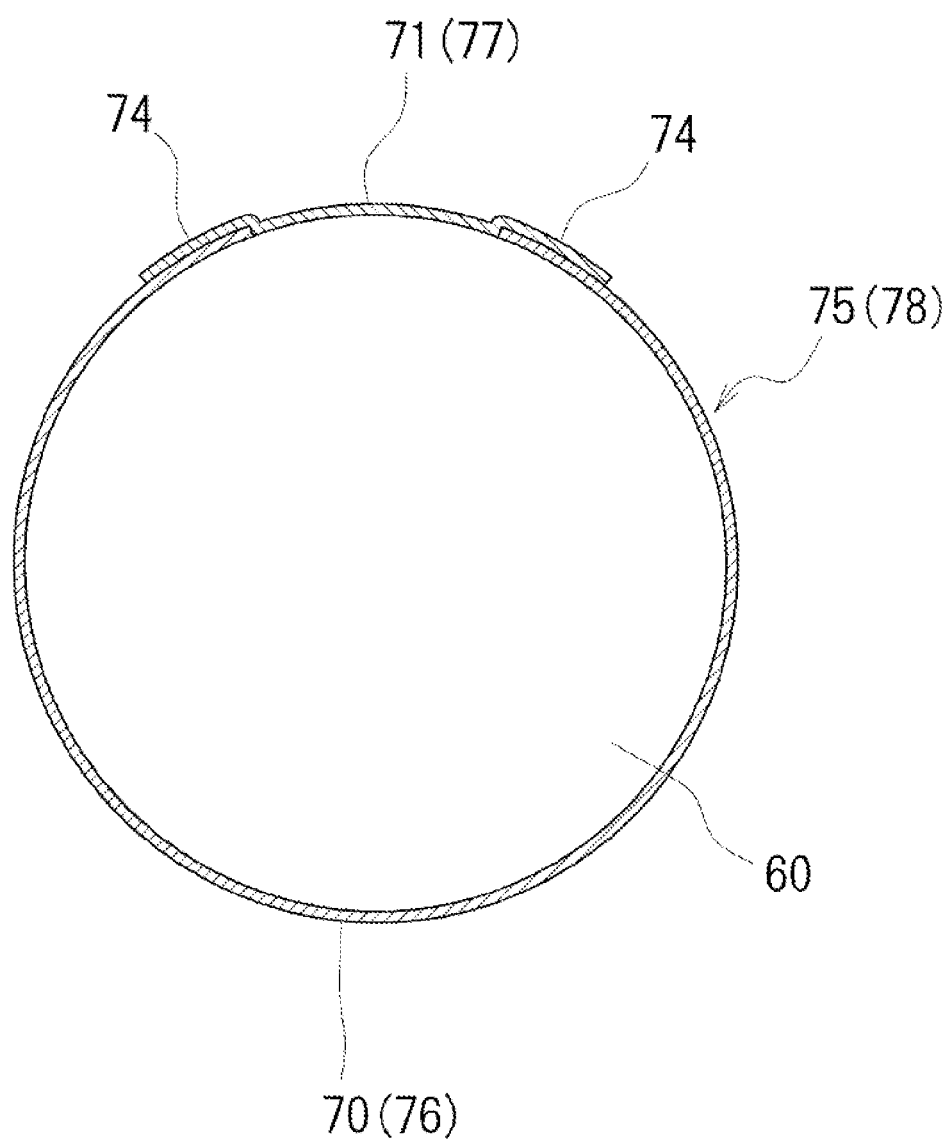
FIG. 7 is a cross-sectional view of a B-B line of FIG. 5.
Figure 8:
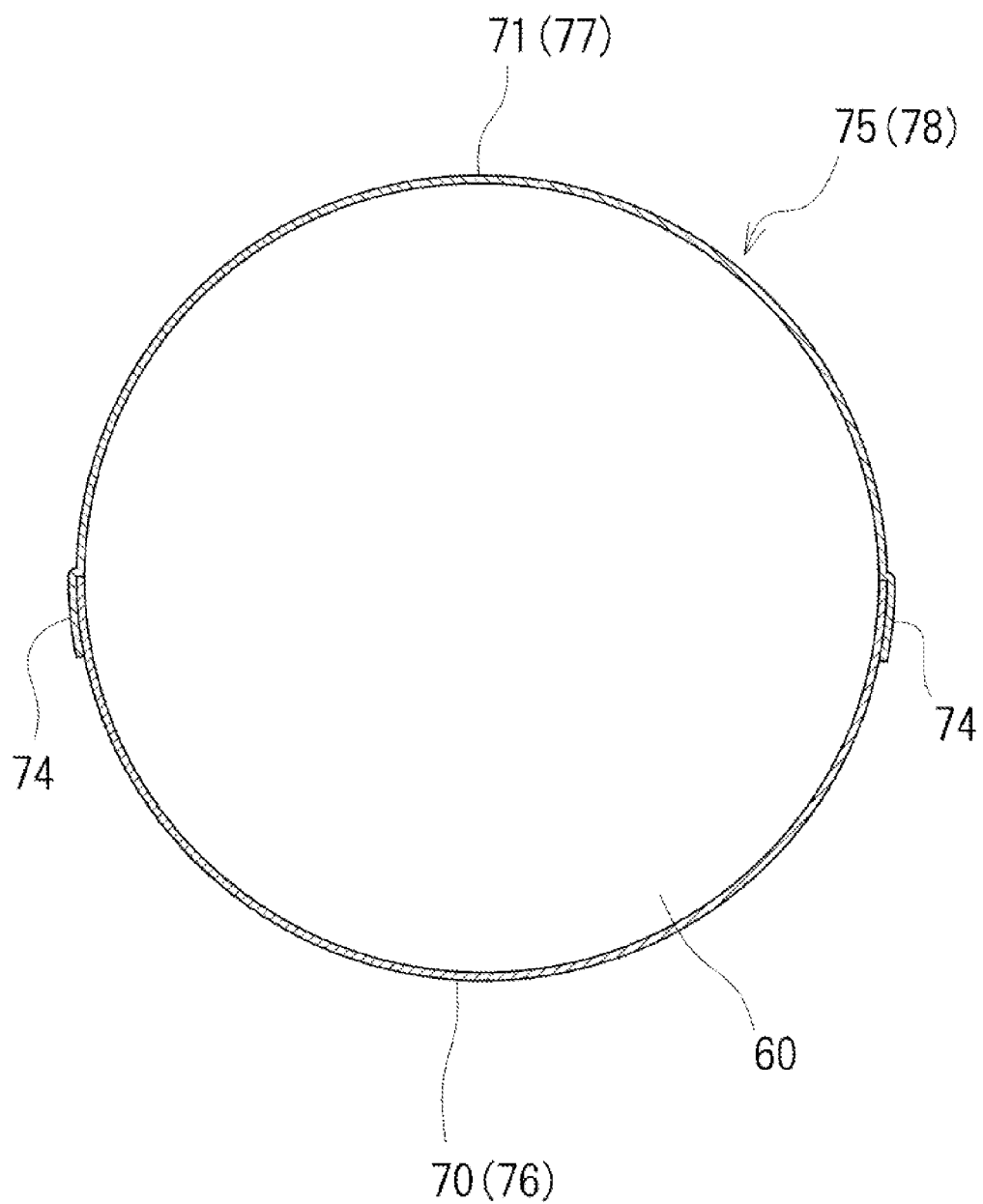
FIG. 8 is a cross-sectional view of a C-C line of FIG. 5.

That is, a main body layer 78 of the rear grip rod body 3 includes the layer 75 formed in a cylindrical shape in one round over the entire length by a main part 76 including the main prepreg 70 and a complementary part 77 including the sub-prepreg 71. As illustrated in FIG. 6, in the small-diameter part 30, the one-round cylindrical layer 75 in the main body layer 78 is configured only by the main part 76 including the main prepreg 70 and there exists one overlapping part 73 in which the both ends 70*a* in the widthwise direction of the main prepreg 70 overlap inside and outside. It must be noted that in FIG. 6, the hatching illustrating the cross-sectional shape of the mandrel 60 is omitted, and the same holds true for FIG. 7 through FIG. 9, and FIG. 11 described later. Furthermore, as illustrated in FIG. 7, in the steeply-expanded diameter part 31, the one-round cylindrical layer 75 in the main body layer 78 is configured by the main part 76 including the main prepreg 70 and the complementary part 77 including the sub-prepreg 71, and the main portion of the entire circumference is occupied by the main part 76 including the main prepreg 70, and the remaining angle region is configured by the complementary part 77 including the sub-prepreg 71. In the steeply-expanded diameter part 31, each of the both inclined edges 71*c* of the sub-prepreg 71 (both ends in the widthwise direction) overlap the outer side in a radial direction of the both ends 70*a* in the widthwise direction of the main prepreg 70, and there are two overlapping parts 74. Furthermore, as illustrated in FIG. 8, in the large-diameter part 32, the one-round cylindrical layer 75 in the main body layer 78 is configured by the main part 76 including the main prepreg 70 and the complementary part 77 including the sub-prepreg 71, and approximately half of the circumference of the entire circumference is configured by the main part 76 including the main prepreg 70, and the remaining approximately half circumference is configured by the complementary part 77 including the sub-prepreg 71. Even in the large-diameter part 32, same as the steeply-expanded diameter part 31, each of the inclined edges 71c of the sub-prepreg 71 overlap the outer side in a radial direction of the both ends 70a in the widthwise direction of the main prepreg 70, and two overlapping parts 74 exist almost 180° opposite to each other.

Figure 9:
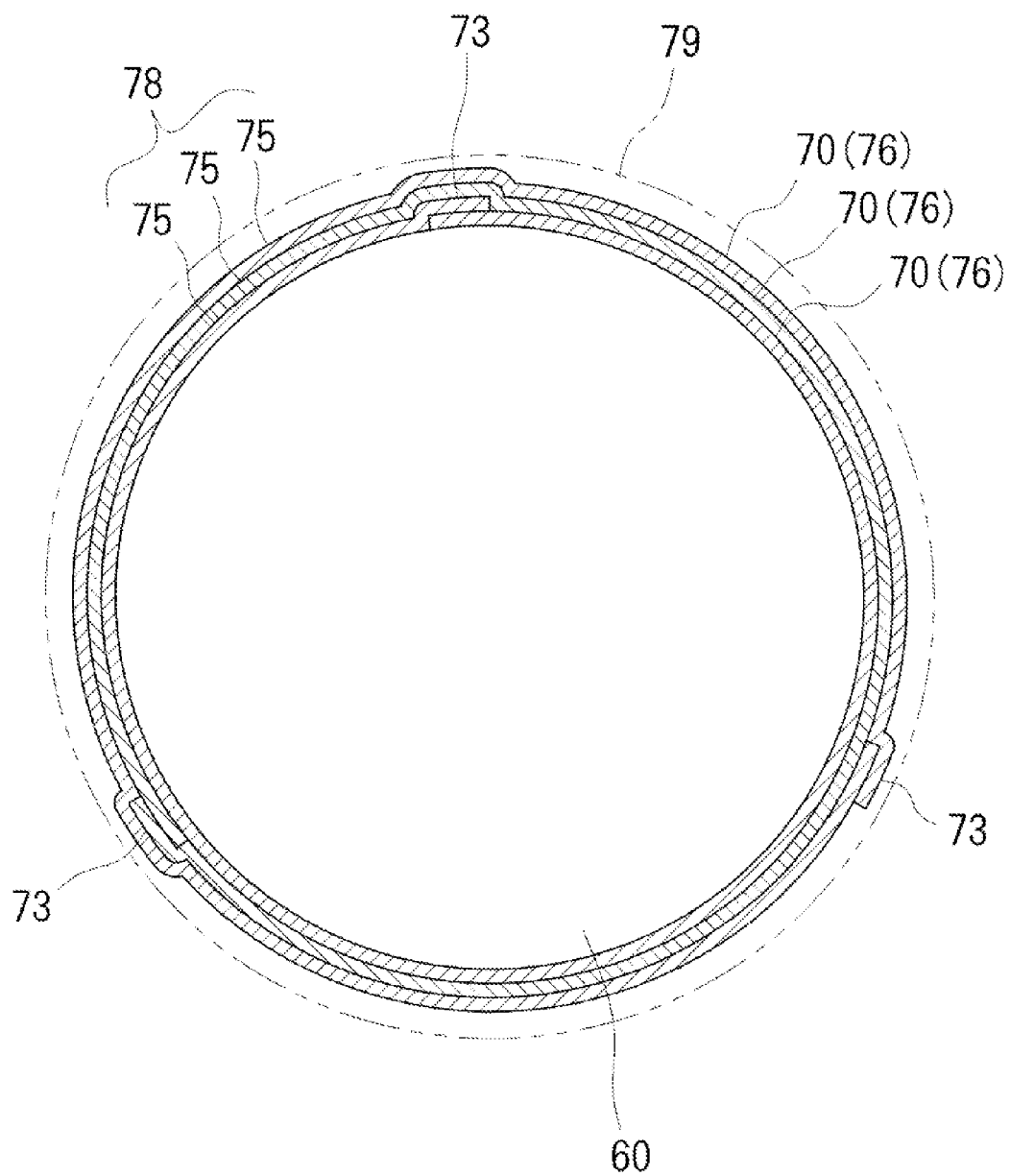
FIG. 9 is a cross-sectional view of the rod body of the same embodiment, and is also a cross-sectional view of a location corresponding to the cross section of the A-A line of FIG. 5.

The main body layer 78 can thus be configured only by a single one-round cylindrical layer 75 formed by the main part 76 including the main prepreg 70 and the complementary part 77 including the sub-prepreg 71, however, in the present embodiment, a total of three layers are formed. That is, the main body layer 78 has a three-layer structure. Therefore, the winding process of the main prepreg 70 and the sub-prepreg 71, such as that illustrated in FIG. 4, is repeated a total of three times. In other words, from the state in FIG. 5, the mandrel 60 is rotated by 120° around the axial line, and the process in FIG. 4 and FIG. 5 is performed, and following this, the mandrel 60 is again rotated by 120° in the same direction, and the process in FIG. 4 and FIG. 5 is performed again. In other words, while being displaced by 120° in one direction, a total of three one-round cylindrical layers 75 formed by the main part 76 and the complementary part 77 are laminated to form a three-layer structure of the main body layer 78. In the main body layer 78 thus formed, for example, as illustrated in FIG. 9, in the small-diameter part 30, the overlapping part 73 formed by the both ends 70a in the widthwise direction of the main prepreg 70 is formed at a total of three locations at an interval of 120°.

In addition, after forming a three-layer structure of the main body layer 78 by using a total of three sets of the main prepreg 70 and the sub-prepreg 71, as described above, an outer layer 79 is formed outside the main body layer 78 by winding a tape-like prepreg (not shown) spirally over the entire length at the outer side thereof. That is, in the present embodiment, the rear grip rod body 3 is made of the main body layer 78 and the outer layer 79. In FIG. 9, the outer layer 79 is shown by alternate long and two short dashes line. The tape-like prepreg is obtained by aligning reinforced fibers, such as carbon fibers, along the longitudinal direction of the prepreg, and thus, various thicknesses can be employed. It is noted that it is preferable to wind the tape-like prepreg in a close winding. Close winding is a state in which winding is performed without leaving any gap, and at the same time, without any overlapping, and as a result of this close winding, the outer layer 79 is formed with a constant thickness without any gap. Following this, a molding tape, which is not shown in the figure, is wound and fastened. The molding tape is wound spirally from one side toward the other side in the direction of the center line of the rear grip rod body 3 while providing an overlapping portion having a predetermined width. After heating and baking, the molding tape is removed and the mandrel 60 is pulled out.

In the rear grip rod body 3 thus formed, the one-round cylindrical layer 75 is formed by the main part 76 including the main prepreg 70 and the complementary part 77 including the sub-prepreg 71, and therefore, as compared to the configuration in which the small-diameter part 30 up to the large-diameter part 32 are formed by a winding provided by a single prepreg, it is less likely that wrinkles occur in the prepreg in the steeply-expanded diameter part 31. As a result, it is easy to manufacture even when the skills of the person performing the task are low. Furthermore, because the main prepreg 70 is wound first to form the winding-shortage part 72, and then the sub-prepreg 71 is wound on the winding-shortage part 72 to form the complementary part 77, as compared to the configuration in which the sub-prepreg 71 is wound first, that is, the configuration in which the complementary part 77 is positioned inside the main part 76, it is easy to accurately position the sub-prepreg 71 with respect to the main prepreg 70.

Furthermore, because the one-round cylindrical layer 75 formed by the main part 76 and the complementary part 77 is formed by a total of three layers to result in a three-layer structure of the main body layer 78, it is possible to use a thin prepreg in the main prepreg 70 and the sub-prepreg 71, because of which the occurrence of wrinkles can be reduced further. In addition, because each layer 75 is laminated by being displaced by 120° at one time in the circumferential direction, the overlapping part 73 of the both ends 70a in the widthwise direction of the main prepreg 70, and the overlapping part 74 of the main prepreg 70 and the sub-prepreg 71 are formed by being displaced in the circumferential direction by 120° at one time between the layers 75, and the thickness of the rear grip rod body 3 can be made more uniform.

In addition, because the main prepreg 70 is a rectangle, and the sub-prepreg 71 is an isosceles triangle, it is possible to easily position the main prepreg 70 and the sub-prepreg 71 in the center of the mandrel 60, which makes manufacturing easier, thus reducing the cutting loss of the prepreg. Furthermore, because the laminate sheet 83 in which the vertical sheet 80 and the horizontal sheet 81 are laminated beforehand and formed integrally is used in the main prepreg 70 and the sub-prepreg 71, even if each layer 75 configuring the main body layer 78 is formed as a single round, the strength of the rear grip rod body 3 can be secured easily.

Figure 11:
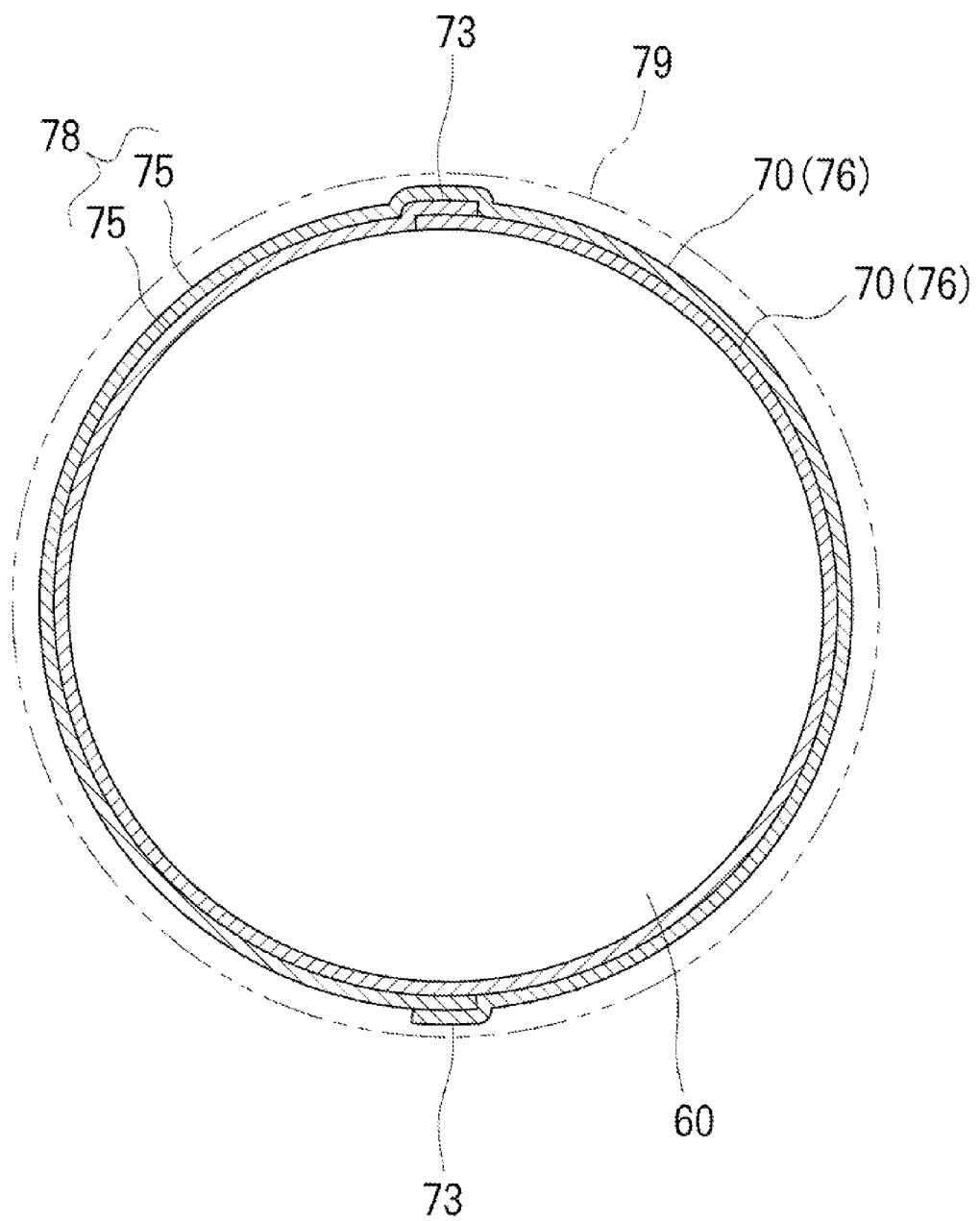
FIG. 11 is a cross-sectional view of a rod body in another embodiment of the present invention, and is also a cross-sectional view of a location corresponding to the cross section of the A-A line of FIG. 5.

It is noted that in the present embodiment, the main body layer 78 had a three-layer structure; however, as in FIG. 11, it is possible to have a two-layer structure, and in the case of a two-layer structure, it is preferable to perform lamination by displacing the cylindrical layer 75 by 180° in the circumferential direction. Furthermore, four or more layers, or a single layer is also possible.

Furthermore, the entire length of the main body layer 78 was formed by the main part 76 and the complementary part 77, however, in the entire length of the main body layer 78, a predetermined-length region including at least the steeply-expanded diameter part 31 may be formed by the main part 76 and the complementary part 77, for example, in the entire length of the main body layer 78, only a predetermined-length region including the steeply-expanded diameter part 31 may be formed by the main part 76 and the complementary part 77, and the predetermined end region other than the predetermined-length region of the main body layer 78 may be formed separately by a single prepreg. However, by forming the main part 76 and the complementary part 77 over the entire length of the main body layer 78, that is, the entire length of the rear grip rod body 3, it becomes easy to manufacture and also easy to secure the strength.

In addition, the main prepreg 70 was a rectangle, and the sub-prepreg 71 was an isosceles triangle, however, for example, the main prepreg 70 may be a trapezoid that is long in the direction of the center line of the rear grip rod body 3, and of which the width increases gradually toward the rear side, and furthermore, the sub-prepreg 71 too may be a trapezoid of which the width increases gradually toward the rear side.

Also, the incline of both the small-diameter part 30 and the large-diameter part 32 was set to zero; however, it may be possible that, instead of setting the incline of both the small-diameter part 30 and the large-diameter part 32 to zero, the incline is a gentle incline and the shape is such that the diameter expands gradually toward the rear side.

Furthermore, in the above embodiment, a case of application in the rear grip rod body 3 was explained; however, the embodiment is not limited to the rear grip rod body 3, and can be used in various types of rod bodies. Furthermore, a fishing rod to which a reel is attached was explained; however, it is possible to apply to a fishing rod of a type to which a reel is not attached, such as a pole.

It must be noted that an inner layer may be formed inside the main body layer 78, and the inner layer can be formed by spirally winding a tape-like prepreg in the same way as the outer layer 79. Furthermore, besides forming a hollow rod body by winding the main prepreg 70 and the sub-prepreg 71 onto the mandrel 60, the main body layer 78 may be formed outside a solid body to form a solid rod body.

What is claimed is:

1. A rod body for a fishing rod, comprising:
   a main body layer formed, in a cylindrical shape having a circumferential direction, from a first main prepreg and a first sub-prepreg, wherein
   the main body layer includes a small-diameter part positioned at a front side of the rod body, a large-diameter part positioned at a rear side of the rod body, and a steeply-expanded diameter part positioned between the small-diameter part and the large-diameter part,
   both an inner and an outer diameter of the steeply-expanded diameter part are expanded toward the rear side by a steeper incline than an incline of the small-diameter part and an incline of the large-diameter part,
   the main body layer comprises a predetermined-length region including at least the steeply-expanded diameter part, the predetermined-length region being configured by a first layer formed, in a cylindrical shape, from a first main part and a first complementary part,
   the first main part is formed by the first main prepreg having a length corresponding to the predetermined-length region, a single sheet of the first main prepreg being wound around the rod body such that the first main prepreg at the small-diameter part has a width required to be wholly wound around a circumference of the rod body at the small-diameter part by one round to create an overlapping part made by both circumferential ends of the first main prepreg at the small-diameter part; and that the first main prepreg at the large-diameter part has a width required to be partly wound around a circumference of the rod body at the large-diameter part to create a winding-shortage part where both of the circumferential ends of the first main prepreg at the large-diameter part do not overlap with each other, and
   the first complementary part is formed to complement the winding-shortage part by the first sub-prepreg having a predetermined shape corresponding to the winding-shortage part such that two overlapping parts are created by both circumferential ends of the first sub-prepreg and both of the circumferential ends of the first main prepreg at the large-diameter part,
   wherein the first sub-prepreg is an isosceles triangle having an apex which is directed toward the front side of the rod body.

2. The rod body for a fishing rod according to claim 1, wherein
   the first complementary part is formed so that the first sub-prepreg is positioned outside the first main prepreg.

3. The rod body for a fishing rod according to claim 1, wherein the predetermined-length region is further configured by a second layer laminated on the first layer.

4. The rod body for a fishing rod according to claim 3, wherein the predetermined-length region is further configured by a third layer laminated on the second layer, the first layer displaced with the second and third layers by 120° in the circumferential direction, the second layer displaced with the first and third layers by 120° in the circumferential direction, the third layer displaced with the first and second layers by 120° in the circumferential direction.

5. The rod body for a fishing rod according to claim 3, wherein the first layer is displaced with the second layer by 180° in the circumferential direction.

6. The rod body for a fishing rod according to claim 1, wherein
   each of the first main prepreg and the first sub-prepreg comprises a vertical sheet having reinforced fibers running along a direction of a center line of the rod body and a horizontal sheet having reinforced fibers running along the circumferential direction of the rod body, the vertical sheet being laminated on the horizontal sheet.

7. The rod body according to claim 1, wherein the first main prepreg is a rectangle having a length that extends in a direction of a center line of the rod body.

8. A fishing rod provided with the rod body for the fishing rod according to claim 1.

* * * * *